(12) United States Patent
Oh et al.

(10) Patent No.: US 9,176,559 B2
(45) Date of Patent: Nov. 3, 2015

(54) DISPLAY DEVICE USING INFRARED SENSOR MODULE AND METHOD OF DRIVING THE SAME

(75) Inventors: Jun-Seok Oh, Gyeongbuk (KR); Shi-Cheol Song, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 46 days.

(21) Appl. No.: 13/273,418

(22) Filed: Oct. 14, 2011

(65) Prior Publication Data

US 2012/0098797 A1  Apr. 26, 2012

(30) Foreign Application Priority Data

Oct. 26, 2010  (KR) .................. 10-2010-0104976

(51) Int. Cl.
*G06F 1/32* (2006.01)
*G06F 3/041* (2006.01)
*G06F 3/042* (2006.01)

(52) U.S. Cl.
CPC ............ *G06F 1/3203* (2013.01); *G06F 3/0416* (2013.01); *G06F 3/0428* (2013.01)

(58) Field of Classification Search
CPC .... G06F 1/3203; G06F 3/0428; G06F 3/0416
USPC ................................ 345/175–176
See application file for complete search history.

(56) References Cited

U.S. PATENT DOCUMENTS

| 4,507,557 | A | * | 3/1985 | Tsikos ....................... 250/341.7 |
| 4,782,328 | A | * | 11/1988 | Denlinger ......................... 341/5 |
| 2006/0007185 | A1 | * | 1/2006 | Kobayashi .................... 345/176 |
| 2006/0138983 | A1 | * | 6/2006 | Lee et al. ....................... 318/254 |
| 2008/0062150 | A1 | * | 3/2008 | Lee ................................. 345/175 |
| 2009/0141002 | A1 | | 6/2009 | Sohn et al. |
| 2012/0032894 | A1 | * | 2/2012 | Parivar et al. ................. 345/173 |
| 2012/0050206 | A1 | * | 3/2012 | Welland ....................... 345/174 |

FOREIGN PATENT DOCUMENTS

KR  10-2009-0057542 A  6/2009

OTHER PUBLICATIONS

Office Action dated May 28, 2013 from the Korean Intellectual Property Office in counterpart Korean Application No. 10-2010-0104976.

* cited by examiner

*Primary Examiner* — Christopher E Leiby
(74) *Attorney, Agent, or Firm* — Morgan, Lewis & Bockius LLP

(57) ABSTRACT

A display device using infrared sensor modules that is capable of reducing power consumption and extending durability of infrared light sources and sensors and a method of driving the same are disclosed. The display device includes a display panel to display images, a plurality of infrared sensor modules to optically detect a touched position on the display panel, an infrared sensor module controller to sequentially drive the infrared sensor modules and to switch the infrared sensor modules to a low-power mode when a touch operation has not been performed within a predetermined period of time or when the display panel is in a power-saving mode, and a system to provide a state of the display panel to the infrared sensor module controller.

7 Claims, 9 Drawing Sheets

DISPLAY DEVICE USING INFRARED SENSOR MODULE AND METHOD OF DRIVING THE SAME

This application claims the benefit of Korean Patent Application No. 10-2010-0104976, filed on Oct. 26, 2010, which is hereby incorporated by reference as if fully set forth herein.

BACKGROUND OF THE INVENTION

1. Field of the Invention

The present invention relates to a display device using infrared sensor modules and a method of driving the same, and more particularly, to a display device using infrared sensor modules that is capable of reducing power consumption and extending durability of infrared light sources and sensors and a method of driving the same.

2. Discussion of the Related Art

Generally, a touch screen is an interface between an information communication device using various kinds of displays and a user. The touch screen is an input apparatus that enables a user to directly contact the screen using a finger or pen for interface with the device.

The touch screen is configured so that a user touches buttons provided on the display using a finger to manipulate the screen interactively and intuitively, and therefore, people of all ages and both sexes can easily use the touch screen. In recent years, therefore, the touch screen has been widely applied to various fields, such as issuing apparatuses in banks and public offices, various kinds of medical equipment, tourist information systems, information systems in major facilities, and traffic information systems.

Based on how touch is recognized, the touch screen may be classified as a resistive type touch screen, a capacitive type touch screen, an ultrasonic type touch screen or an infrared type touch screen.

Although the aforementioned touch screens provide different advantages, the infrared type touch screen has lately attracted considerable attention because of minimized pressure applied to a touch surface and convenience of arrangement.

The infrared type touch screen includes three infrared sensor modules disposed at three corners of a liquid crystal display panel. Each of the infrared sensor modules includes infrared light sources to emit infrared light and sensors to sense incident light. The light emitted from the infrared light sources is incident upon a light receiving unit by a retro-reflection plate disposed at each side of the liquid crystal display panel, and a touched position is recognized by the sensors.

In the infrared type touch screen, however, light is continuously emitted from the infrared light sources, and the light is sensed by the sensors, even when the touch screen has not been touched for a long period of time. That is, even when a touch operation has not been actually performed, the infrared light sources and the sensors are driven, which increases power consumption. The increased power consumption reduces durability of the infrared light sources and the sensors.

Also, the three infrared sensor modules are disposed at the corresponding corners of the liquid crystal display panel. For this reason, interference based on direct light between the infrared light sources facing each other occurs with the result that a touch waveform is interfered with, and therefore, touch performance is lowered.

SUMMARY OF THE INVENTION

Accordingly, the present invention is directed to a display device using infrared sensor modules and a method of driving the same that substantially obviate one or more problems due to limitations and disadvantages of the related art.

An object of the present invention is to provide a display device using infrared sensor modules that is capable of reducing power consumption and extending durability of infrared light sources and sensors and a method of driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a display panel to display images, a plurality of infrared sensor modules to optically detect a touched position on the display panel, an infrared sensor module controller to sequentially drive the infrared sensor modules and to switch the infrared sensor modules to a low-power mode when a touch operation has not been performed within a predetermined period of time or when the display panel is in a power-saving mode, and a system to provide a operation mode of the display panel to the infrared sensor module controller.

Each of the infrared sensor modules may include a plurality of infrared light sources to emit infrared light, an illumination meter lens to adjust an emission angle of the infrared light, a plurality of sensors to sense the infrared light, an object lens to condense the infrared light upon the sensors, and an optical filter located in front of the infrared light sources or the sensors to filter the infrared light so that only the infrared light is transmitted.

The infrared sensor module controller may include a timer to check the touch operation every predetermined cycle, a sequential drive unit to sequentially drive the infrared sensor modules, an analog to digital converter to convert analog signals sensed by the infrared sensor modules into digital signals, and a mode switching unit to switch the infrared sensor modules to a low-power mode when the touch operation has not been performed within the predetermined period of time as the result of checking through the timer or when the display panel is in the power-saving mode and to switch the infrared sensor modules to a normal mode when the touch operation has been performed within the predetermined period of time or when images are displayed on the display panel.

mode switching unit may include a comparison and determination unit to determine whether the infrared sensor modules are in the low-power mode or the normal mode based on the determination as to whether the touch operation has been performed within the predetermined period of time and based on a state of the display panel, a frame rate adjustment unit to adjust a frame rate when the infrared sensor modules are in the low-power mode to reduce light emission power of the infrared light sources and sensing speed of the sensors, and a clock speed adjustment unit to adjust a clock speed when the infrared sensor modules are in the low-power mode to reduce a clock speed of the infrared sensor module controller or to switch the analog to digital converter to a sleep mode.

In another aspect of the present invention, a method of driving a display device, having a display panel, a plurality of infrared sensor modules to optically detect a touched position on the display panel, and an infrared sensor module controller to control the infrared sensor modules, includes determining whether or not a touch operation has been performed within a predetermined period of time through a timer and whether the display panel is in a power-saving mode or a normal mode, and switching the infrared sensor modules and the infrared sensor module controller to a low-power mode through a mode switching unit when the touch operation has not been performed within the predetermined period of time or when the display panel is in the power-saving mode or switching the infrared sensor modules and the infrared sensor module controller to a normal mode through the mode switching unit when the touch operation has been performed within the predetermined period of time or when images are displayed on the display panel.

Each of the infrared sensor modules may include a plurality of infrared light sources to emit infrared light, an illumination meter lens to adjust an emission angle of the infrared light, a plurality of sensors to sense the infrared light, an object lens to condense the infrared light upon the sensors, and an optical filter located in front of the infrared light sources or the sensors to filter the infrared light so that only the infrared light is transmitted.

The method may further include adjusting a frame rate to reduce light emission power of the infrared light sources and sensing speed of the sensors when the infrared sensor modules and the infrared sensor module controller are switched to the low-power mode through the mode switching unit.

The method may further include adjusting a clock speed to reduce a clock speed of the infrared sensor module controller when the infrared sensor modules and the infrared sensor when the infrared sensor modules and the infrared sensor module controller are switched to the low-power mode through the mode switching unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In the following, a detailed description of configurations incorporated herein will be omitted when it may make the subject matter of the present invention rather unclear.

Hereinafter, preferred embodiments of the present invention will be described in detail with reference to FIGS. 1 to 8.

Figure 1:
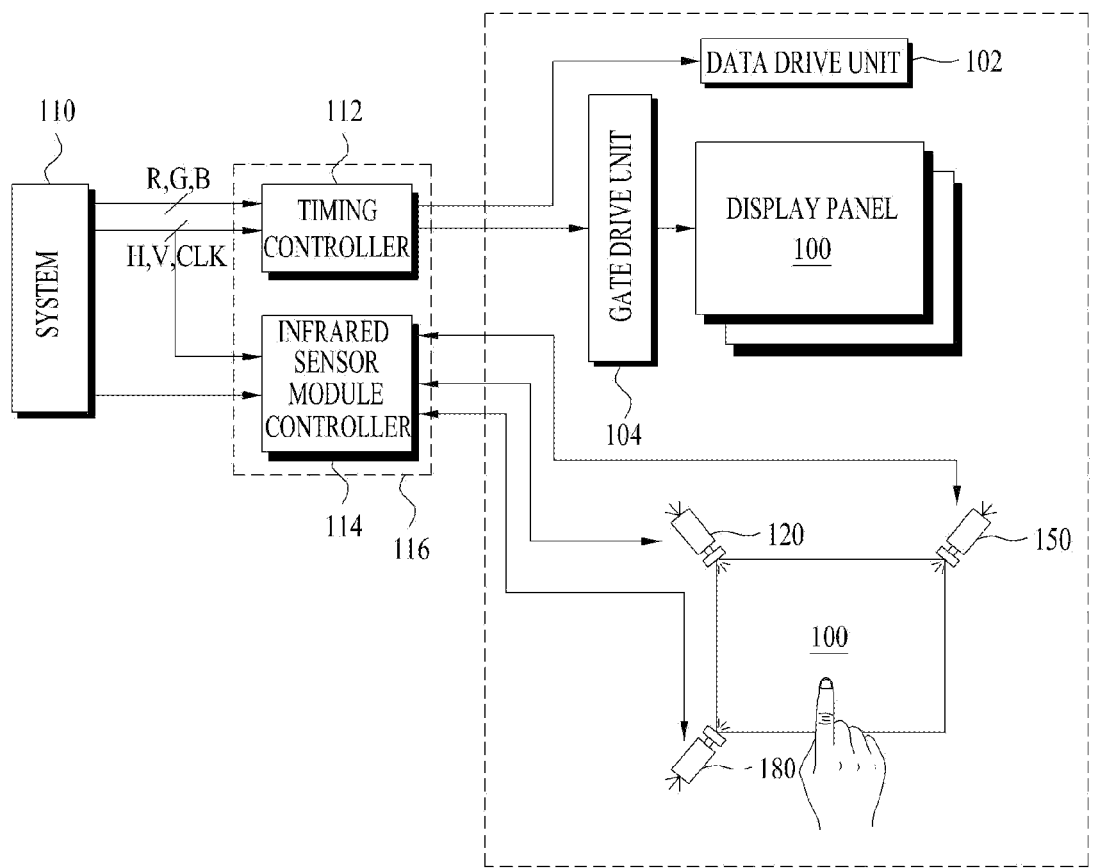
FIG. 1 is a block diagram showing a display device using an optical sensing unit according to an embodiment of the present invention.

FIG. 1 is a block diagram showing a display device using an optical sensing unit according to an embodiment of the present invention.

Referring to FIG. 1, the display device includes a display panel 100 to display images, a plurality of infrared sensor modules 120, 150 and 180 to optically detect touched positions on the display panel 100, a controller board 116 to control the display panel 100 or the of infrared sensor modules 120, 150 and 180, and a system 110 to provide data to be displayed together with a timing signal to the controller board 116.

The display panel 100 includes a lower substrate, an upper substrate facing the lower substrate, and a middle layer disposed between the lower substrate and the upper substrate. The middle layer may be changed according to a principle of driving the display panel 100. The middle layer may be formed of a liquid crystal, an electrophoretic material, an organic luminescent material or an electroluminescent material. Based on the component of the middle layer, the display panel may be a liquid crystal display panel, an organic luminescent material display panel or an electroluminescent display panel. In this embodiment, a liquid crystal display panel having a middle layer formed of a liquid crystal will be described as an example. A liquid crystal panel drive unit is provided to drive a data line and a gate line of the liquid crystal display panel.

The liquid crystal display panel 100 includes a lower substrate having a thin film transistor connected to the gate line and the data line, an upper substrate having color filters to realize colors, a pixel electrode connected to the film transistor, and a common electrode to form a vertical electric field or a horizontal electric field together with the pixel electrode.

The color filters are formed at the upper substrate to divide colors based on a black matrix. The color filters are formed on the basis of red (R), green (G) and blue (B) to realize red, green and blue colors.

The common electrode may be formed on the rear of the upper substrate as a transparent conductive film to form a vertical electric field together with the pixel electrode or may be formed on the lower substrate as a transparent conductive film to form a horizontal electric field together with the pixel electrode. Reference voltage, i.e. common voltage, to drive the liquid crystal is supplied to the common electrode.

The thin film transistor is formed on the lower substrate to selectively supply a data signal from the data line to the pixel electrode in response to a gate signal from the gate line. To this end, the thin film transistor includes a gate electrode connected to the gate line, a source electrode connected to the data line, a drain electrode connected to the pixel electrode, active layers overlapped in a state in which the gate electrode and a gate dielectric film are disposed between the active layers to form a channel between the source electrode and the drain electrode, and an ohmic contact layer to achieve ohmic contact between one of the active layers and the source electrode and between the other of the active layers and the drain electrode.

The pixel electrode is independently formed at each pixel area so that the pixel electrode overlap with the color filters R, G and B. The pixel electrode is connected to the drain electrode of the thin film transistor. Also, the pixel electrode overlaps with the common electrode in a state in which a liquid crystal layer is disposed between the pixel electrode and the common electrode to form a vertical electric field or is formed on the same substrate to form a horizontal electric field. Upon supply of a data signal through the thin film transistor, the pixel electrode forms a vertical electric field or a horizontal electric field together with the common electrode, to which common voltage has been supplied, with the result that liquid crystal molecules arranged in the vertical direction are rotated according to dielectric anisotropy. Transmissivity of light transmitted through the pixel area is changed based on a rotation degree of the liquid crystal molecules to realize gradation.

The liquid crystal panel may be driven in a twisted-nematic (TN) mode in which electrodes are mounted at two substrates, liquid crystal directors are arranged so that the liquid crystal directors are twisted 90 degrees, and voltage is applied to the electrodes to drive the liquid crystal directors, in an in-plane switching (IPS) mode in which two electrodes are formed on a substrate, and liquid crystal directors are controlled by a horizontal electric field generated between the electrodes, or in a fringe field switching (FFS) mode in which two electrodes are formed as transparent conductive members, and liquid crystal molecules are driven by a fringe field formed between the electrodes disposed so that the distance between the electrodes is small. However, the mode of driving the liquid crystal panel is not limited to the aforementioned modes.

The liquid crystal panel drive unit includes a data drive unit 102 to supply data voltage to data lines of the liquid crystal display panel 100 and a gate drive unit 104 to supply scan pulses to the gate lines of the liquid crystal display panel 100.

The data drive unit 102 includes a plurality of data integrated circuits. The data drive unit 102 converts digital video data R, G and B input from the controller board 116 into positive-polarity or negative-polarity analog gamma correction voltage and supplies the analog gamma correction voltage to the data lines as data voltage under control of the controller board 116.

The gate drive unit 104 includes a plurality of gate integrated circuits. The gate drive unit 104 sequentially supplies scan pulses to the gate lines under control of the controller board 116.

The data integrated circuits of the data drive unit and the gate integrated circuits of the gate drive unit may be formed a lower glass substrate by tape automated bonding (TAB) using a tape carrier package (TCP) or by chip on glass (COG).

Figure 2:
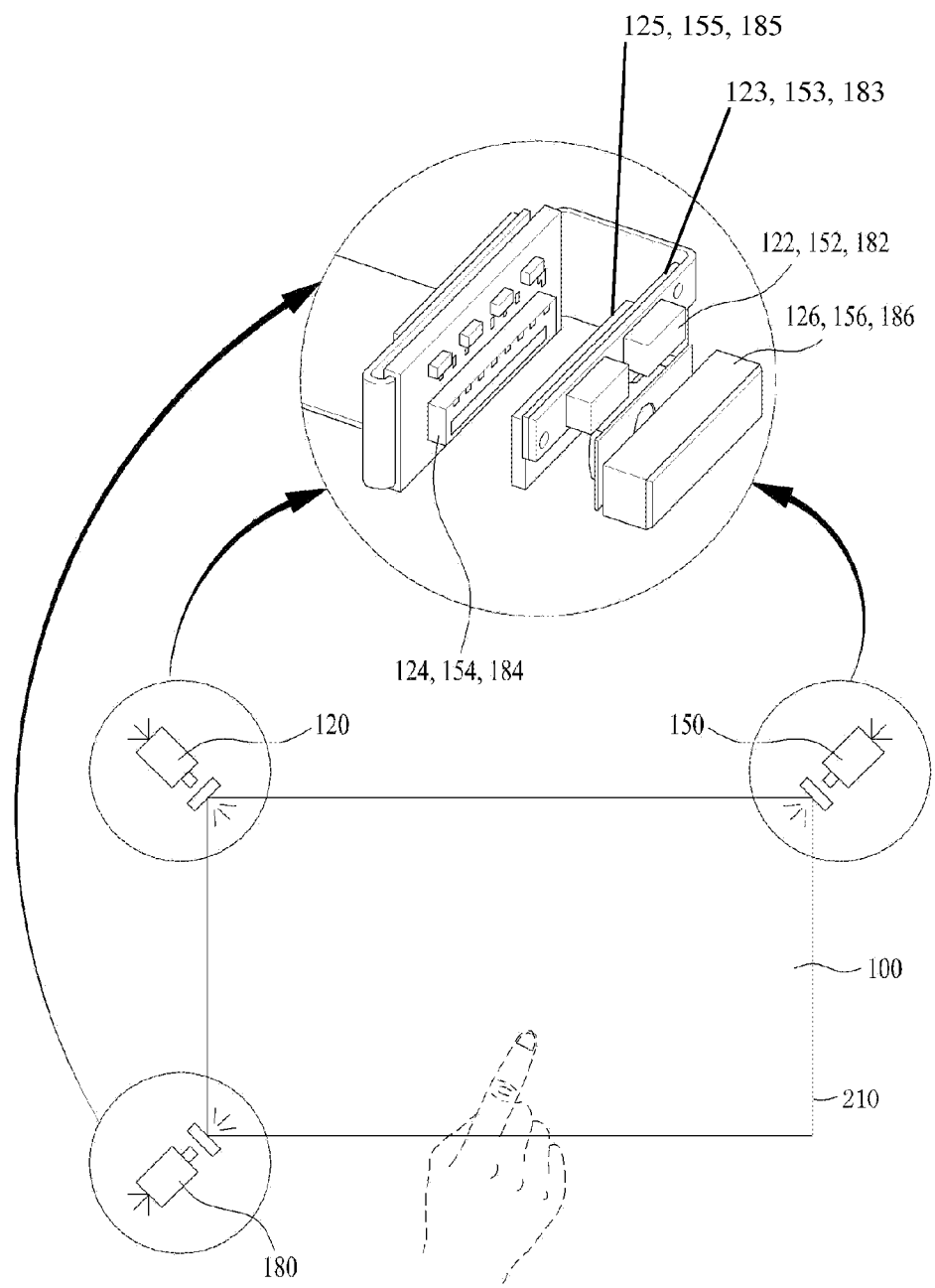
FIG. 2 is perspective and plan views showing infrared sensor modules disposed at corners of a liquid crystal display panel.
Figure 3:
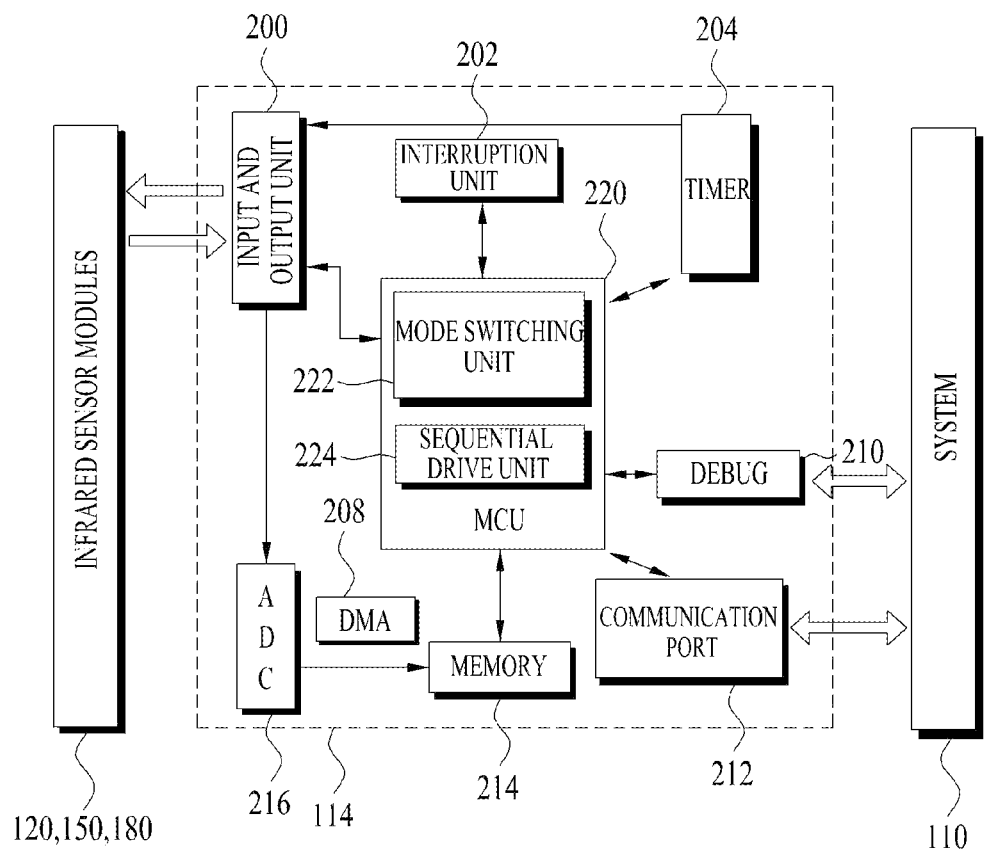
FIG. 3 is a block diagram of an infrared sensor module controller shown in FIG. 1.

FIG. 2 is perspective and plan views showing infrared sensor modules disposed at corners of the liquid crystal display panel, and FIG. 3 is a block diagram of an infrared sensor module controller shown in FIG. 1.

The infrared sensor modules are disposed at at least two of the four corners of a pixel array, on which images are displayed, of the liquid crystal display panel to optically detect touched position on the liquid crystal display panel. In this embodiment, three infrared sensor modules 120, 150 and 180 disposed at three corners of the liquid crystal display panel 100 will be described as an example.

The first infrared sensor module 120 is located at the upper corner of one side of the liquid crystal display panel 100. The first infrared sensor module 120 includes a plurality of first infrared light sources 122 to emit infrared light, a first illumination meter lens 123 to adjust an emission angle of the infrared light, a first object lens 125 to condense received light, a plurality of first sensors 124 to sense the condensed light, and a first optical filter 126 located in front of the first infrared light sources 122 or the first sensors 124 to filter infrared light so that only the infrared light is transmitted.

Specifically, the first infrared light sources 122 emit light to the pixel array at the upper corner of one side of the liquid crystal display panel 100. Light emitted from the first infrared light sources 122 is reflected by a retro-reflection plate 210 and is incident upon a first light receiving unit. As a result, a touch position is recognized by the first sensors 124. The first infrared sensor module 120 emits or receives light within a range of 0 to 90 degrees at the upper corner of one side of the liquid crystal display panel 100. At this time, the angle of light emitted from or received by the first infrared sensor module 120 is not limited to a range of 0 to 90 degrees. For example, the angle of the emitted or received light may be 0 to 180 degrees.

The second infrared sensor module 150 is located at the upper corner of the other side of the liquid crystal display panel 100. The second infrared sensor module 150 includes a plurality of second infrared light sources 152 to emit infrared light, a second illumination meter lens 153 to adjust an emission angle of the infrared light, a second object lens 155 to condense received light, a plurality of second sensors 154 to sense the condensed light, and a second optical filter 156 located in front of the second infrared light sources 152 or the second sensors 154 to filter infrared light.

Specifically, the second infrared light sources 152 emit light to the pixel array at the upper corner of the other side of the liquid crystal display panel 100. Light emitted from the second infrared light sources 152 is reflected by a retro-reflection plate 210 and is incident upon a second light receiving unit. As a result, a touch position is recognized by the second sensors 154. The second infrared sensor module 150 emits or receives light within a range of 0 to 90 degrees at the upper corner of the other side of the liquid crystal display panel 100. At this time, the angle of light emitted from or received by the second infrared sensor module 150 is not limited to a range of 0 to 90 degrees. For example, the angle of the emitted or received light may be 0 to 180 degrees.

The third infrared sensor module 180 is located at the lower corner of one side of the liquid crystal display panel 100. The third infrared sensor module 180 includes a plurality of third infrared light sources 182 to emit infrared light, a third illumination meter lens 183 to adjust an emission angle of the infrared light, a third object lens 185 to condense received light, a plurality of third sensors 184 to sense the condensed light, and a third optical filter 186 located in front of the third infrared light sources 182 or the third sensors 184 to filter infrared light.

Specifically, the third infrared light sources 182 emit light to the pixel array at the lower corner of one side of the liquid crystal display panel 100. Light emitted from the third infrared light sources 182 is reflected by a retro-reflection plate 210 and is incident upon a third light receiving unit. As a result, a touch position is recognized by the third sensors 184. The third infrared sensor module 180 emits or receives light within a range of 0 to 90 degrees at the lower corner of one side of the liquid crystal display panel 100. At this time, the angle of light emitted from or received by the third infrared sensor module 180 is not limited to a range of 0 to 90 degrees. For example, the angle of the emitted or received light may be 0 to 180 degrees.

Meanwhile, when a user touches at least two positions, an imaginarily touched position is generated in addition to the actually touched positions. At this time, coordinates of the touched positions measured by the first infrared sensor module 120 and the second infrared sensor module 150 are compared with coordinates of the touched positions measured by the first infrared sensor module 120 and the third infrared sensor module 180 to distinguish between the actually touched positions and the imaginarily touched position. Also, the first infrared sensor module 120 and the second infrared sensor module 150 are located at opposite ends of the upper side of the liquid crystal display panel 100 with the result that a dead zone, in which it is not possible to sense light or it is difficult to emit light, is generated. At this time, the third infrared sensor module 180 is located at the lower side of the liquid crystal display panel 100 to sense light in the dead zone or emit light to the dead zone, thereby improving the dead zone. As described above, the infrared sensor modules 120, 150 and 180 are located at three corners of the liquid crystal display panel 100 to accurately measure the touched positions, thereby compensating for the dead zone.

The controller board 116 includes a timing controller 112 to control the gate drive unit 104 and the data drive unit 102 and an infrared sensor module controller 114 to control the infrared sensor modules 120, 150 and 180.

The timing controller 112 generates a gate control signal to control operation timing of the gate drive unit 104 and a data control signal to control operation timing of the data drive unit 102 using vertical and horizontal synchronizing signals V and H and a clock signal CLK. Also, the timing controller 112 supplies digital video data R, G and B input from the system 110 to the data drive unit 102.

As shown in FIG. 3, the infrared sensor module controller 114 includes an input and output unit 200 to input or output signals sensed by the infrared sensor modules 120, 150 and 180, an analog to digital converter 216 to convert analog signals sensed by the infrared sensor modules 120, 150 and 180 into digital signals, a timer 204 to check a touch operation every predetermined cycle, a direct memory access (DMA) 208 to which materials are moved without execution of a program in a microcontroller unit (MCU) 220, a memory 214, as a storage device, to store programmed command codes, a program debugger 210 to find programming errors and reveal a cause thereof, and a communication port 212 to receive an operating system (OS) power-saving mode signal from the system 110 or transmit or receive a signal to or from the system 110.

The timer 204 checks signals sensed by the infrared sensor modules 120, 150 and 180, input through the input and output unit 200, every predetermined cycle and supplies the checked signals to a mode switching unit 222. In other words, the timer 204 checks every predetermined cycle whether a user has touched the display panel 100. When the user has touched the display panel 100, the infrared light sources 122, 152 and 182 or the sensors 124, 154 and 184 of the infrared sensor modules 120, 150 and 180 are operated, and the sensed signals are supplied to the timer 204. On the other hand, when the user has not touched the display panel 100, the infrared light sources 122, 152 and 182 or the sensors 124, 154 and 184 of the infrared sensor modules 120, 150 and 180 are not operated, and the sensed signals are not supplied to the timer 204.

The MCU 220 includes a sequential drive unit 224 to calculate coordinates of a touched position sensed by the infrared sensor modules 120, 150 and 180 and to sequentially drive the infrared sensor modules 120, 150 and 180, and a mode switching unit 222 to switch the infrared sensor modules 120, 150 and 180 to a low-power mode when a touch operation has not been performed within a predetermined period of time or when the OS of the liquid crystal display panel 100 is in a power-saving mode.

The sequential drive unit 224 sequentially turns on/off the first to third infrared light sources 122, 152 and 182 and the first to third sensors 124, 154 and 184 of the first to third infrared sensor modules 120, 150 and 180. At this time, light interference occurs between the infrared light sources facing each other. For example, light emitted from the second infrared light sources 152 interferes with light emitted from the third infrared light sources 182. The sequential drive unit 224 sequentially drives the first to third infrared light sources 122, 152 and 182, and therefore, light interference between the infrared light sources facing each other is prevented.

Figure 4:
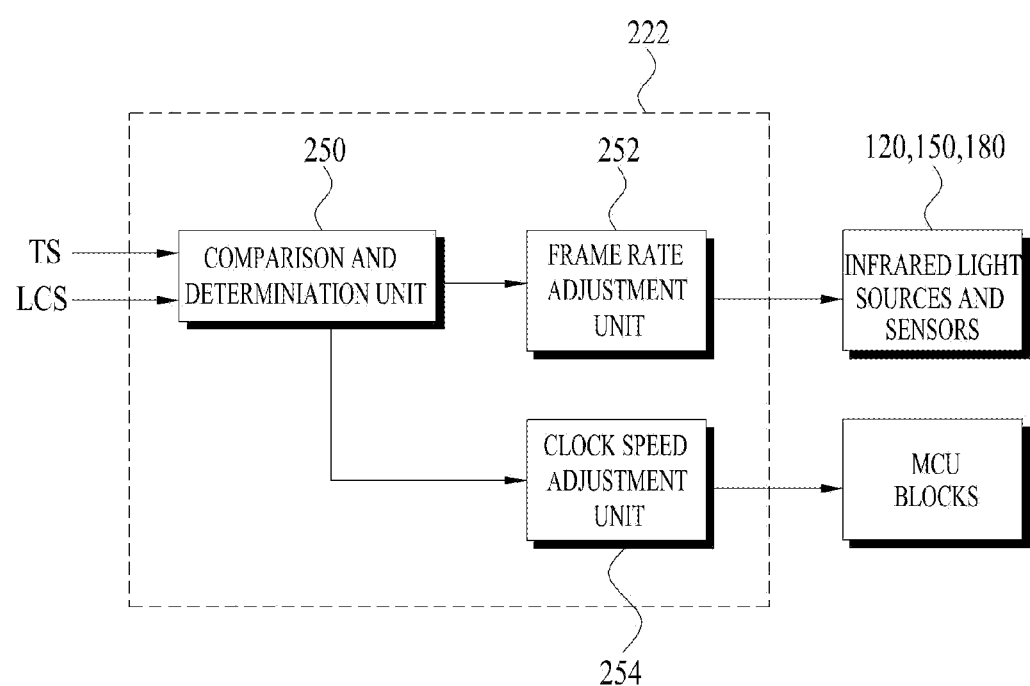
FIG. 4 is a block diagram of a mode switching unit shown in FIG. 1.

As shown in FIG. 4, the mode switching unit 222 includes a comparison and determination unit 250, a frame rate adjustment unit 252 and a clock speed adjustment unit 254.

The comparison and determination unit 250 determines whether a touch operation TS has been performed within a predetermined period of time and whether the liquid crystal display panel 100 is in a normal mode LCS or in a power-saving mode. When the touch operation has not been performed within the predetermined period of time or when the liquid crystal display panel 100 is in the power-saving mode, the comparison and determination unit 250 supplies a low-power mode signal to the frame rate adjustment unit 252 and the clock speed adjustment unit 254. Meanwhile, in the comparison and determination unit 250, the period of time is previously set. The period of time may be set by a user.

When receiving the low-power mode signal through the comparison and determination unit 250, the frame rate adjustment unit 252 adjusts a frame rate to switch the infrared light sources 122, 152 and 182 and the sensors 124, 154 and 184 to a low-power mode. That is, when the low-power mode signal is supplied, the frame rate adjustment unit 252 reduces the frame rate to reduce the light emission power of the infrared light sources 122, 152 and 182 and the sensing speed of the sensors 124, 154 and 184. For example, when the frame rate is 120 Hz in the normal mode, the frame rate is may be reduced to 10 Hz in the low-power mode.

When receiving the low-power mode signal through the comparison and determination unit 250, the clock speed adjustment unit 254 reduces the speed of an internal clock CLOCK of the MCU 220 and switches the analog to digital converter 216 to a sleep mode.

Figure 5:
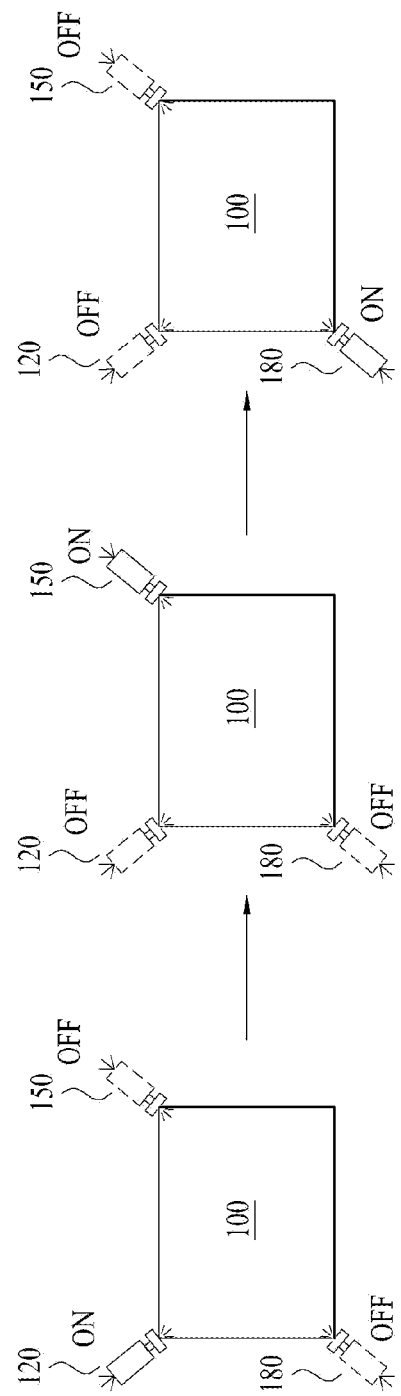
FIG. 5 is plan views showing first to third infrared sensor modules sequentially driven by the sequential drive unit.
Figure 6:
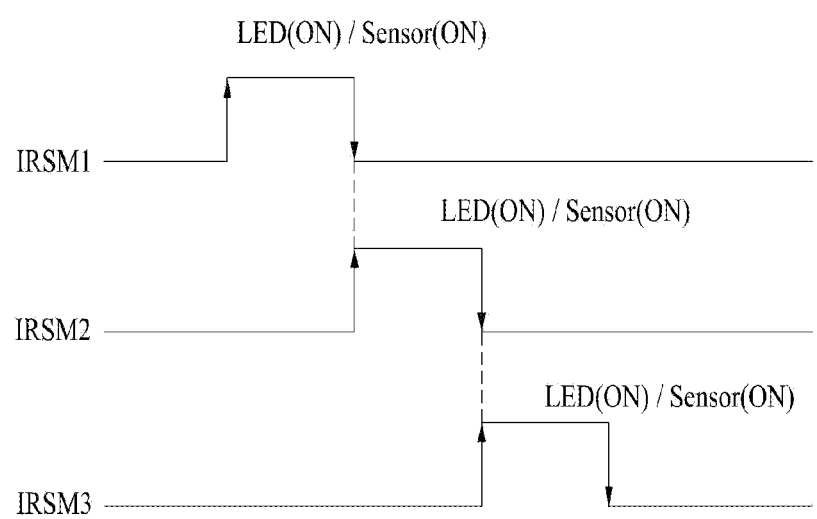
FIG. 6 is a view showing signals to sequentially drive the first to third infrared sensor modules.

FIG. 5 is plan views showing the first to third infrared sensor modules sequentially driven by the sequential drive unit, and FIG. 6 is a view showing signals to sequentially drive the first to third infrared sensor modules.

First, as shown in FIGS. 5 and 6, the sequential drive unit 224 turns on the first infrared light sources 122 and the first sensors 124 of the first infrared sensor module (IRSM1) 120. At this time, the infrared light sources 152 and 182 and the sensors 154 and 184 of the second and third infrared sensor modules (IRSM2 and IRSM3) 150 and 180 are kept off.

Subsequently, the first infrared light sources 122 and the first sensors 124 of the first infrared sensor module (IRSM1) 120 are turned off, and then the second infrared light sources 152 and the second sensors 154 of the second infrared sensor module (IRSM2) 150 are turned on. At this time, the infrared light sources 122 and 182 and the sensors 124 and 184 of the first and third infrared sensor modules (IRSM1 and IRSM3) 120 and 180 are kept off.

Subsequently, the second infrared light sources 152 and the second sensors 154 of the second infrared sensor module (IRSM2) 150 are turned off, and then the third infrared light sources 182 and the third sensors 184 of the third infrared sensor module (IRSM3) 180 are turned on. At this time, the infrared light sources 122 and 152 and the sensors 124 and 154 of the first and second infrared sensor modules (IRSM1 and IRSM2) 120 and 150 are kept off. When the infrared sensor modules are sequentially driven as described above, the infrared sensor modules facing each other do not emit light diagonally, since the infrared sensor modules are located at the respective corners of the liquid crystal display panel. Consequently, light interference does not occur.

Figure 7:
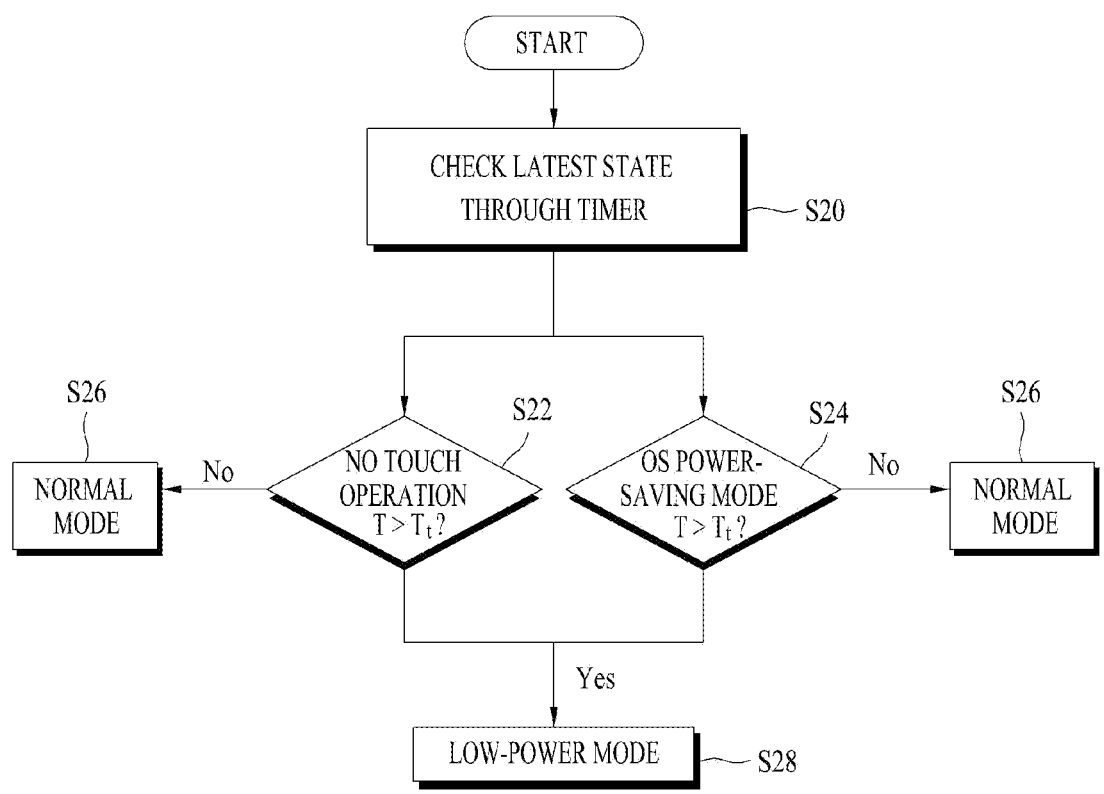
FIG. 7 is a flow chart showing a method of driving a display device using infrared sensor modules according to an embodiment of the present invention.

FIG. 7 is a flow chart showing a method of driving a display device using infrared sensor modules according to an embodiment of the present invention.

Hereinafter, a method of driving a display device using infrared sensor modules according to an embodiment of the present invention will be described.

First, the comparison and determination unit 250 checks the latest state through the timer 204 (S20) and determines whether a touch operation has been performed within a predetermined period of time (T>Tt) (S22).

When the touch operation has been performed within the predetermined period of time, the comparison and determination unit 250 determines that the current mode is a normal mode and maintains the normal mode (S26).

When the touch operation has not been performed within the predetermined period of time, the comparison and determination unit 250 determines that the current mode is a low-power mode and switches the infrared sensor modules 120, 150 and 180 to the low-power mode. In addition, the comparison and determination unit 250 switches the infrared sensor module controller 114 to the low-power mode.

Also, the comparison and determination unit 250 determines from the system 110 whether the operating system (OS) of the liquid crystal display panel 100 is in a power-saving mode or in a normal mode (S24). When the OS of the liquid crystal display panel 100 is in the power-saving mode, the comparison and determination unit 250 determines that the current mode is a low-power mode and switches the infrared sensor modules 120, 150 and 180 to the low-power mode. In addition, the comparison and determination unit 250 switches the infrared sensor module controller 114 to the low-power mode.

When the touch operation has not been performed within the predetermined period of time or the OS of the liquid crystal display panel is in the power-saving mode, as described above, i.e. when one of the two conditions is satisfied, the comparison and determination unit 250 performs switching to the low-power mode.

When the OS of the liquid crystal display panel 100 is in the normal mode, the comparison and determination unit 250 determines that the current mode is the normal mode and maintains the normal mode.

Figure 8:
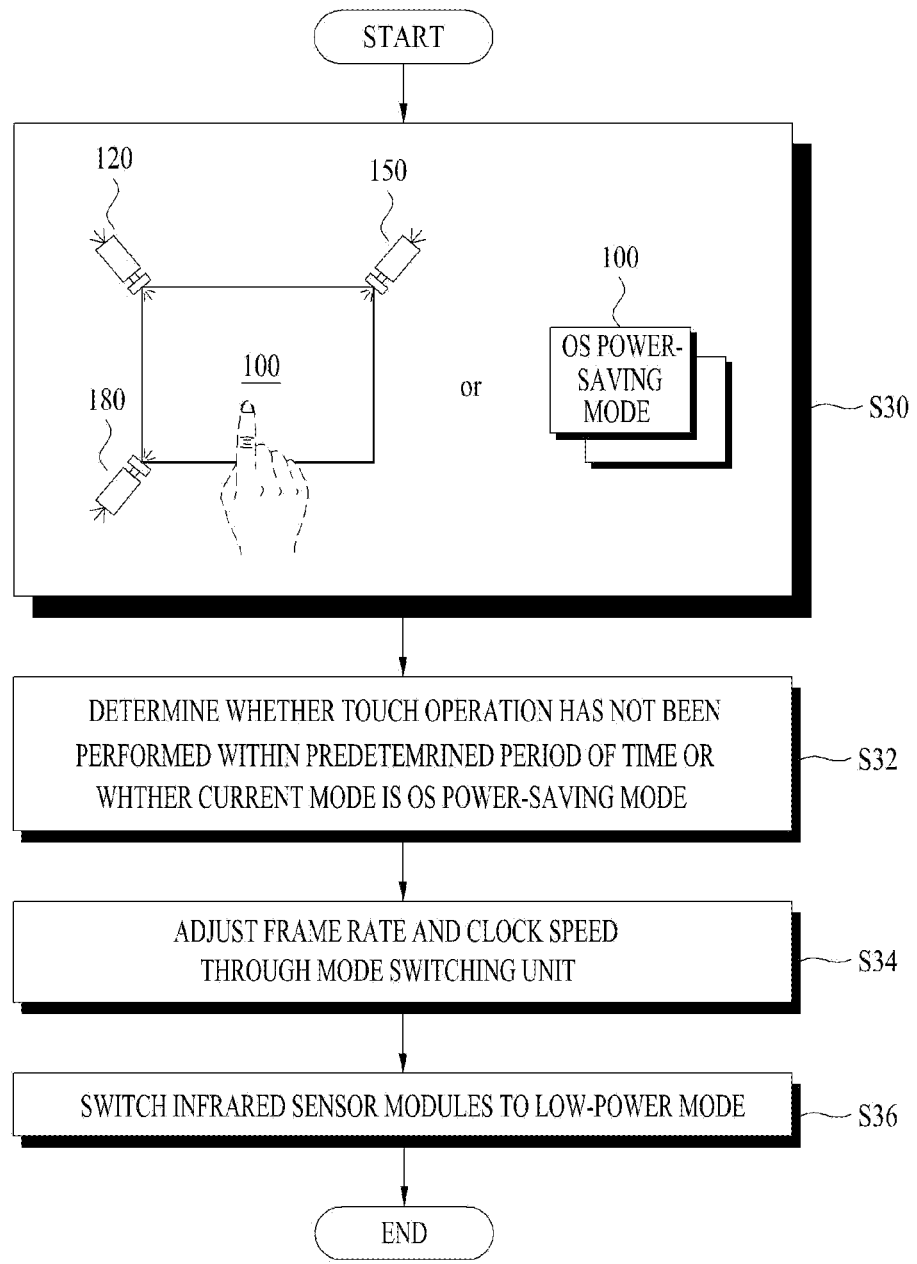
FIG. 8 is a flow chart showing a low-power mode drive method according to an embodiment of the present invention.

FIG. 8 is a flow chart showing a low-power mode drive method according to an embodiment of the present invention.

Referring to FIG. 8, the low-power mode drive method determines whether or not a touch operation has been performed through the timer 204 every predetermined cycle and whether the liquid crystal display panel 100 is in the power-saving mode (S30).

When the touch operation has not been performed or when the liquid crystal display panel 100 is in the power-saving mode, the comparison and determination unit 250 determines that the current mode is the low-power mode, and a low-power mode signal is supplied to the frame rate adjustment unit 252 and the clock speed adjustment unit 254. At this time, when the touch operation has not been performed or when the liquid crystal display panel 100 is in the power-saving mode, the comparison and determination unit 250 determines that the current mode is a low-power mode (S32).

Subsequently, when the low-power mode signal is supplied through the comparison and determination unit 250, the frame rate adjustment unit 252 switches the infrared light sources 122, 152 and 182 and the sensors 124, 154 and 184 to the low-power mode. As a result, the light emission power of the infrared light sources 122, 152 and 182 and the sensing speed of the sensors 124, 154 and 184 are reduced (S34).

Also when the low-power mode signal is supplied through the comparison and determination unit 250, the clock speed adjustment unit 254 reduces the speed of the internal clock of the MCU 220 and switches the analog to digital converter 216 to a sleep mode.

As a result, the infrared sensor modules and the infrared sensor module controller are switched to the low-power mode (S36).

Figure 9:
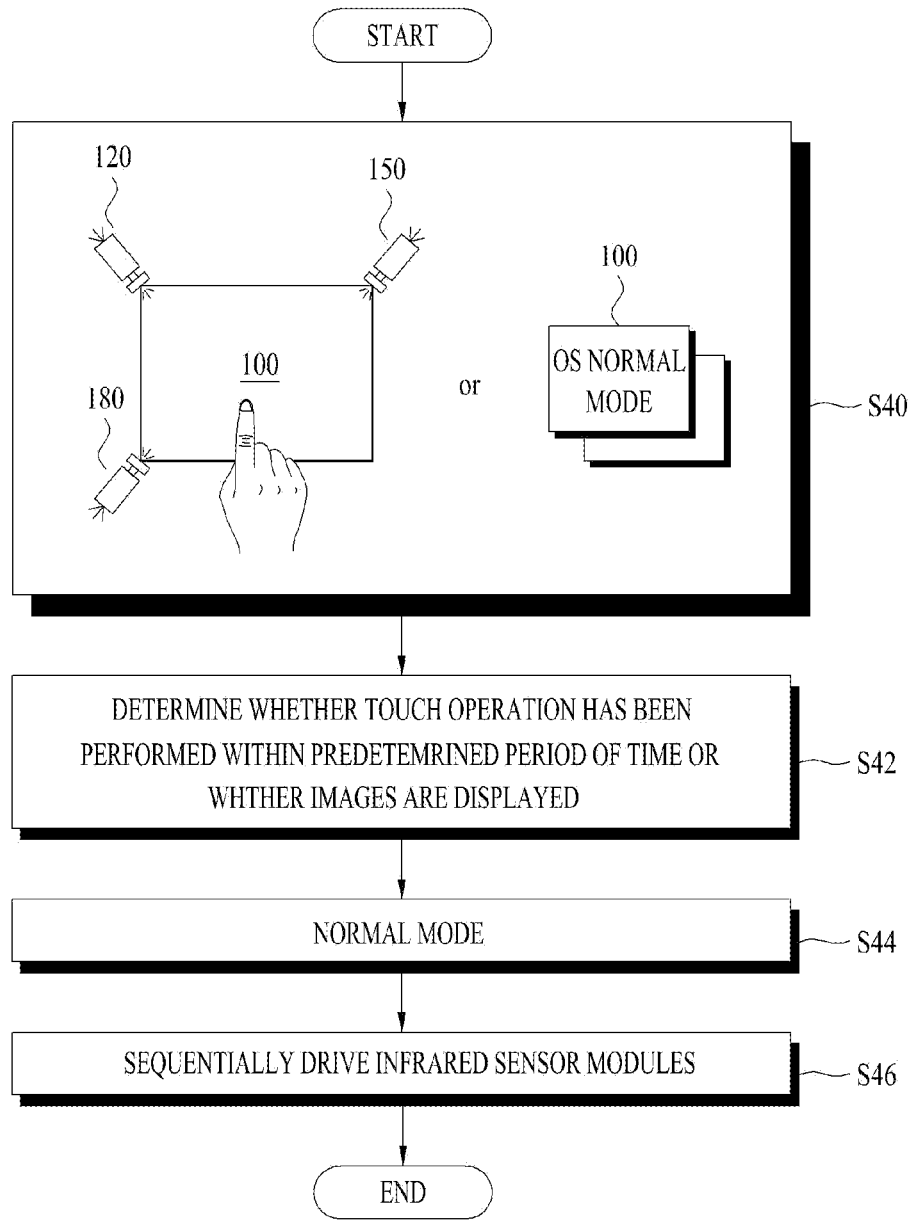
FIG. 9 is a flow chart showing a normal mode drive method according to an embodiment of the present invention.

FIG. 9 is a flow chart showing a normal mode drive method according to an embodiment of the present invention.

Referring to FIG. 9, the normal mode drive method determines whether a touch operation has been performed and whether the liquid crystal display panel 100 is in the normal mode through the timer 204 every predetermined cycle (S40).

First, when the touch operation has been performed or when the liquid crystal display panel 100 is in an OS normal mode, the comparison and determination unit 250 determines that the current mode is a normal mode and maintains the normal mode. At this time, when the touch operation has been performed or when the liquid crystal display panel 100 is in the OS normal mode, the comparison and determination unit 250 determines that the current mode is the normal mode (S42).

Next, when the comparison and determination unit 250 determines that the current mode is the normal mode (S44), the infrared sensor modules 120, 150 and 180 are sequentially driven, and the light emission power of the infrared light sources 122, 152 and 182 and the sensing speed of the sensors 124, 154 and 184 are driven in the normal mode (S46). Also, the clock speed of the MCU 220 in the infrared sensor module controller is normally maintained, and the analog to digital converter 216 is switched from the sleep mode to the normal mode.

As is apparent from the above description, a display device using infrared sensor modules according to an embodiment of the present invention switches the infrared sensor modules and an infrared sensor module controller to a low-power mode when a touch operation has not been performed within a predetermined period of time or when the display panel is in a power-saving mode.

Consequently, power consumption is reduced, thereby extending durability of infrared light sources and sensors of the infrared sensor modules.

Also, the infrared sensor modules are sequentially driven, and therefore, interference based on direct light between the infrared sensor modules facing each other does not occur, thereby improving touch performance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
    a display panel configured to display images;
    a plurality of infrared sensor modules configured to optically detect a touched position on the display panel;
    a retro-reflection plate disposed at each side of the display panel; and
    an infrared sensor module controller configured to:
        receive an operation mode of the display panel from a system;
        switch the infrared sensor modules to a low-power mode when a touch operation has not been performed within a predetermined period of time; and
        switch the infrared sensor modules to the low-power mode when the display panel is in a power-saving mode,
    wherein the infrared sensor modules comprise:
        a first infrared sensor module located at the upper corner of one side of the display panel,
        a second infrared sensor module located at the upper corner of the other side of the display panel, and
        a third infrared sensor module located at the lower corner of the one side of the display panel,
    wherein each of the first to third infrared sensor modules comprises:
        a plurality of infrared light sources configured to emit infrared light, and
        a plurality of sensors configured to sense the infrared light that is reflected by the retro-reflection plate,
    wherein the infrared sensor module controller is further configured to sequentially turn on/off the first to third infrared sensor modules when the touch operation has been performed within a predetermined period of time or, based on whether images are displayed on the display panel, and
    wherein the infrared sensor module controller comprises:
        a comparison and determination unit configured to determine the low-power mode or a normal mode, based on whether the touch operation has been performed within the predetermined period of time or whether the display panel is operated in a power-saving mode;
        a frame rate adjustment unit configured to adjust a frame rate when the low-power mode is determined to reduce light emission power of the infrared light sources and sensing speed of the sensors;
        a microcontroller unit (MCU) comprising a clock speed adjustment unit configured to reduce a clock speed of an internal clock of the MCU in the low-power mode,
        a direct memory access to which information is moved without execution of a program in the MCU,
        a memory, as a storage device, configured to store programmed command codes,
        a program debugger configured to find programming errors and reveal a cause thereof, and
        a communication port configured to:
            receive an operating system (OS) power-saving mode signal from the system, or
            transmit or receive a signal to or from the system.

2. The display device according to claim 1, wherein each of the infrared sensor modules further comprises:
    an illumination meter lens configured to adjust an emission angle of the infrared light;
    an object lens configured to condense the infrared light upon the sensors; and
    an optical filter located in front of the infrared light sources or the sensors configured to filter the infrared light such that only the infrared light is transmitted.

3. The display device according to claim 1, wherein the infrared sensor module controller further comprises:
    a timer to check the touch operation every predetermined cycle;
    a sequential drive unit to sequentially drive the infrared sensor modules;
    an analog to digital converter to convert analog signals sensed by the infrared sensor modules into digital signals; and
    a mode switching unit to switch the infrared sensor modules to a low-power mode when the touch operation has not been performed within the predetermined period of time as the result of checking through the timer or when the display panel is in the power-saving mode and to switch the infrared sensor modules to the normal mode when the touch operation has been performed within the predetermined period of time or when images are displayed on the display panel.

4. The display device according to claim 3, wherein
    the clock speed adjustment unit is further configured to adjust the clock speed when the infrared sensor modules are in the low-power mode to reduce a clock speed of the infrared sensor module controller or to switch the analog to digital converter to a sleep mode.

5. A method of driving a display device having a display panel, a plurality of infrared sensor modules to optically detect a touched position on the display panel, and an infrared sensor module controller to control the infrared sensor modules, the method comprising:
    receiving an operation mode of the display panel from a system;
    determining:
        whether or not a touch operation has been performed within a predetermined period of time through a timer; and
        whether the display panel is in a power-saving mode or a normal mode; and
    switching the infrared sensor modules and the infrared sensor module controller:
        to a low-power mode through a mode switching unit when the touch operation has not been performed within the predetermined period of time to reduce light emission power of the infrared light sources and sensing speed of the sensors, and to the low power mode through the mode switching unit when the display panel is in the power-saving mode, or
        to a normal mode through the mode switching unit when the touch operation has been performed within the predetermined period of time or when images are displayed on the display panel,
    wherein the infrared sensor modules comprise:
        a first infrared sensor module located at the upper corner of one side of the display panel,
        a second infrared sensor module located at the upper corner of the other side of the display panel, and
        a third infrared sensor module located at the lower corner of the one side of the display panel,
    wherein each of the first to the third infrared sensor modules comprises:
        a plurality of infrared light sources to emit infrared light, and
        a plurality of sensors to sense the infrared light that is reflected by a retro-reflection plate disposed at each side of the display panel, wherein the infrared sensor module controller sequentially turns on/off the first to third infrared sensor modules when the touch operation has been performed within a predetermined period of time or when images are displayed on the display panel, and
wherein the infrared sensor module controller comprises:
- a comparison and determination unit configured to determine the low-power mode or a normal mode based on whether the touch operation has been performed within the predetermined period of time or whether the display panel is operated in a power-saving mode;
- a frame rate adjustment unit configured to adjust a frame rate when the low-power mode is determined to reduce light emission power of the infrared light sources and sensing speed of the sensors;
- a microcontroller unit (MCU) comprising a clock speed adjustment unit configured to reduce a clock speed of an internal clock of the MCU in the low-power mode,
- a direct memory access to which information is moved without execution of a program in the MCU,
- a memory, as a storage device, to store programmed command codes,
- a program debugger to find programming errors and reveal a cause thereof, and
- a communication port to:
  - receive an operating system (OS) power-saving mode signal from the system, or
  - transmit or receive a signal to or from the system.

6. The method according to claim 5, wherein each of the infrared sensor modules further comprises:
- an illumination meter lens to adjust an emission angle of the infrared light;
- an object lens to condense the infrared light upon the sensors; and
- an optical filter located in front of the infrared light sources or the sensors to filter the infrared light so that only the infrared light is transmitted.

7. The method according to claim 6, further comprising adjusting a clock speed to reduce a clock speed of the infrared sensor module controller when the infrared sensor modules and the infrared sensor when the infrared sensor modules and the infrared sensor module controller are switched to the low-power mode through the mode switching unit.

* * * * *